United States Patent
Masuda

(10) Patent No.: US 10,300,840 B2
(45) Date of Patent: May 28, 2019

(54) VEHICLE LAMP CONTROL SYSTEM

(71) Applicant: KOITO MANUFACTURING CO., LTD., Tokyo (JP)

(72) Inventor: Takeshi Masuda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 217 days.

(21) Appl. No.: 15/116,445

(22) PCT Filed: Jan. 30, 2015

(86) PCT No.: PCT/JP2015/052624
§ 371 (c)(1),
(2) Date: Aug. 3, 2016

(87) PCT Pub. No.: WO2015/119046
PCT Pub. Date: Aug. 13, 2015

(65) Prior Publication Data
US 2017/0015236 A1    Jan. 19, 2017

(30) Foreign Application Priority Data
Feb. 4, 2014 (JP) .................. 2014-019689

(51) Int. Cl.
*B60Q 1/14* (2006.01)
*B62D 15/02* (2006.01)
(Continued)

(52) U.S. Cl.
CPC ......... *B60Q 1/1423* (2013.01); *B62D 15/021* (2013.01); *F21S 41/143* (2018.01);
(Continued)

(58) Field of Classification Search
CPC ... H05B 33/0845; H05B 6/04; F21S 48/1225; F21S 48/125; F21S 48/328; B40Q 1/1423; B62D 15/021
See application file for complete search history.

(56) References Cited

U.S. PATENT DOCUMENTS

2009/0231866 A1* 9/2009 Yamamura ............ B60Q 1/085
362/466
2010/0213872 A1* 8/2010 Heider ..................... B60Q 1/12
315/297
(Continued)

FOREIGN PATENT DOCUMENTS

| EP | 2574502 A1 | 4/2013 |
|---|---|---|
| JP | 200776511 * | 3/2007 |

(Continued)

OTHER PUBLICATIONS

Search Report dated Apr. 7, 2015, issued by the International Searching Authority in counterpart International Application No. PCT/JP2015/052624 (PCT/ISA/210).
(Continued)

*Primary Examiner* — Kevin M Nguyen
(74) *Attorney, Agent, or Firm* — Sughrue Mion, PLLC

(57) ABSTRACT

A vehicle lamp control system comprises a light source unit in which a plurality of semiconductor light emitting elements are arranged in a predetermined direction, an electric current setting unit that can set a first electric current distribution and a second electric current distribution in which electric current value is smaller than that of the first electric current distribution, and a control unit. When a plurality of semiconductor light emitting elements of each of second lamp units are turned off after an additional light distribution pattern employing a first electric current distribution is formed, a headlamp control unit controls so that all the semiconductor light emitting elements are turned off
(Continued)

after the plurality of semiconductor light emitting elements are turned on based on a second electric current distribution.

6 Claims, 10 Drawing Sheets

(51) Int. Cl.
*F21S 41/14* (2018.01)
*F21S 45/47* (2018.01)
*H05B 33/08* (2006.01)
*F21S 41/143* (2018.01)
*F21S 41/255* (2018.01)
*F21S 41/663* (2018.01)
*F21Y 115/10* (2016.01)

(52) U.S. Cl.
CPC ............. *F21S 41/18* (2018.01); *F21S 41/663* (2018.01); *H05B 33/0845* (2013.01); *F21S 41/255* (2018.01); *F21S 45/47* (2018.01); *F21Y 2115/10* (2016.08)

(56) References Cited

U.S. PATENT DOCUMENTS

| | | | | |
|---|---|---|---|---|
| 2012/0313526 | A1* | 12/2012 | Lee | F21K 9/00 |
| | | | | 315/113 |
| 2013/0127340 | A1* | 5/2013 | Huhn | B60Q 1/0041 |
| | | | | 315/77 |
| 2013/0169154 | A1* | 7/2013 | Kay | B60Q 1/12 |
| | | | | 315/81 |

FOREIGN PATENT DOCUMENTS

| | | |
|---|---|---|
| JP | 200776511 A | 3/2007 |
| JP | 2009218155 A | 9/2009 |
| JP | 2009259622 A | 11/2009 |
| JP | 201382390 A | 5/2013 |

OTHER PUBLICATIONS

Written Opinion dated Apr. 7, 2015, issued by the International Searching Authority in counterpart International Application No. PCT/JP2015/052624 (PCT/ISA/237).

\* cited by examiner

VEHICLE LAMP CONTROL SYSTEM

TECHNICAL FIELD

The present invention relates to a vehicle lamp control system.

BACKGROUND ART

A vehicle headlamp system is known which employs an array of a plurality of light emitting elements (for example, light emitting diodes) as a light source. In this vehicle headlamp system, an illuminating range that is defined as a light distribution pattern that is formed by light emitted from all the light sources is divided into a plurality of partial areas, and at least one of plurality of the light emitting elements is allocated to each of the partial areas. Then, at least one of the plurality of partial areas that make up the illuminating range can selectively be put in an illuminated state or a non-illuminated state by controlling the light emitting elements to be turned on or off independently (refer to Japan Patent Publication No. 2009-218155, for example).

SUMMARY OF THE INVENTION

It is possible to form various light distribution patterns within the illuminating range by controlling the positions and shapes of illuminated areas by the use of this technique. Then, an optimum light distribution control can be performed according to a driving condition of a vehicle without providing an additional mechanism to a lamp unit. For example, the direction of light distribution can be changed by swiveling an illuminated partial area to the left or right within the illuminating range. This can omit a swiveling mechanism for swiveling a lamp unit mechanically to move the illuminating position of the lamp unit (the direction of an optical axis of the lamp) to the left or right.

Incidentally, in the vehicle headlamp system described above, a predetermined electric current distribution is prepared to form a predetermined light distribution pattern. Then, the light emitting elements are fed with electric current at values that are set individually therefor according to the electric current distribution, and light emitted from the light emitting elements is increased and decreased at almost the same speed. Owing to this, the light emitting elements whose electric current values are low are turned off first, and the light emitting elements whose electric current values are high are turned off last, this causing the driver to feel a sensation of physical disorder. In addition, there is also such a situation that even though the light emitting elements have the same electric current values in the predetermined electric current distribution, the light emitting elements are turned off at different timings due to an error in controlling electric current, resulting in occurrence of deterioration in appearance of the headlamp when it is turned off.

An object of the present invention is to provide a vehicle lamp control system that can not only restrain the driver from feeling a sensation of physical disorder but also enhance the appearance of a lamp when the lamp is turned off.

With a view to solving the problem, according to the present invention, there is provided a vehicle lamp control system including:

a light source unit in which a plurality of semiconductor light emitting elements are arranged in a predetermined direction;

an electric current setting unit that can set a first electric current distribution in which electric current values for the plurality of semiconductor light emitting elements to form a predetermined light distribution pattern ahead of a lamp are set individually for the plurality of semiconductor light emitting elements and a second electric current distribution in which almost the same electric current values are set individually for at least part of the plurality of semiconductor light emitting elements and whose mean electric current value is smaller than that of the first electric current distribution; and a control unit that controls individually the turning on and off of the plurality of semiconductor light emitting elements based on the electric current distributions set by the electric current setting unit, wherein when the light source unit is turned off from a state in which a light distribution pattern is formed by using the first electric current distribution, the control unit performs a control in which all the plurality of semiconductor light emitting elements are turned off after the plurality of semiconductor light emitting elements are turned on based on the second electric current distribution.

According to the vehicle lamp control system that is configured in the way described above, when the light source unit is turned off from the state in which the light distribution pattern is formed by using the first electric current distribution, all the semiconductor light emitting elements are turned off almost altogether after the plurality of semiconductor light emitting elements are turned on based on the second electric current distribution in which almost the same electric current values are set individually for at least part of the plurality of semiconductor light emitting elements and whose mean electric current value is smaller than that of the first electric current distribution. Consequently, the driver can be restrained from feeling a sensation of physical disorder that the driver would otherwise feel due to the individual semiconductor light emitting elements being turned off in an irregular fashion, and the appearance of the lamp when the lamp is turned off can be enhanced.

In the vehicle lamp control system of the present invention, the electric current setting unit can set a third electric current distribution whose mean electric current value is smaller than that of the second electric current distribution, and when the light source unit is turned off from a state in which a light distribution pattern is formed by using the first electric current distribution, the control unit performs a control in which all the plurality of semiconductor light emitting elements are turned off after the plurality of semiconductor light emitting elements are turned on based on the second electric current distribution and further, the plurality of semiconductor light emitting elements are turned on based on the third electric current distribution According to the vehicle lamp control system configured in the way described above, all the plurality of semiconductor light emitting elements are turned off after the plurality of semiconductor light emitting elements are turned on based on the second electric current distribution and further, the plurality of semiconductor light emitting elements are turned on based on the third electric current distribution. Thus, the appearance of the lamp when the light source unit is turned off can be enhanced further.

In the vehicle lamp control system of the present invention, the predetermined light distribution pattern is preferably a high beam light distribution pattern.

According to the vehicle lamp control system configured in the way described above, when the high beam is turned off, the driver can be retrained from feeling a sensation of physical disorder, and the appearance of the lamp can be enhanced.

According to the present invention, the sensation of physical disorder that would be felt by the driver can be suppressed, and the appearance of the lamp can be enhanced.

BRIEF DESCRIPTION OF DRAWINGS

FIGS. 5A to 5C show graphs showing electric current distributions that are supplied to a second lamp unit, in which FIG. 5A is a graph showing a first electric current distribution, FIG. 5B is a graph showing a second electric current distribution, and FIG. 5C is a graph showing an electric current distribution when the second lamp unit is turned off.

FIGS. 6A and 6B are graphs sowing electric current distributions that are supplied to the second lamp unit in a control according to a reference example 1, of which FIG. 6A is a graph showing an electric current distribution when the second lamp unit is turned on, and FIG. 6B is a graph showing an electric current distribution when the second lamp unit is turned off.

FIGS. 7A and 7B are graphs sowing electric current distributions that are supplied to the second lamp unit in a control according to a reference example 2, of which FIG. 7A is a graph showing an electric current distribution when the second lamp unit is turned on, and FIG. 7B is a graph showing an electric current distribution when the second lamp unit is turned off.

DETAILED DESCRIPTION OF EMBODIMENTS

Figure 1:
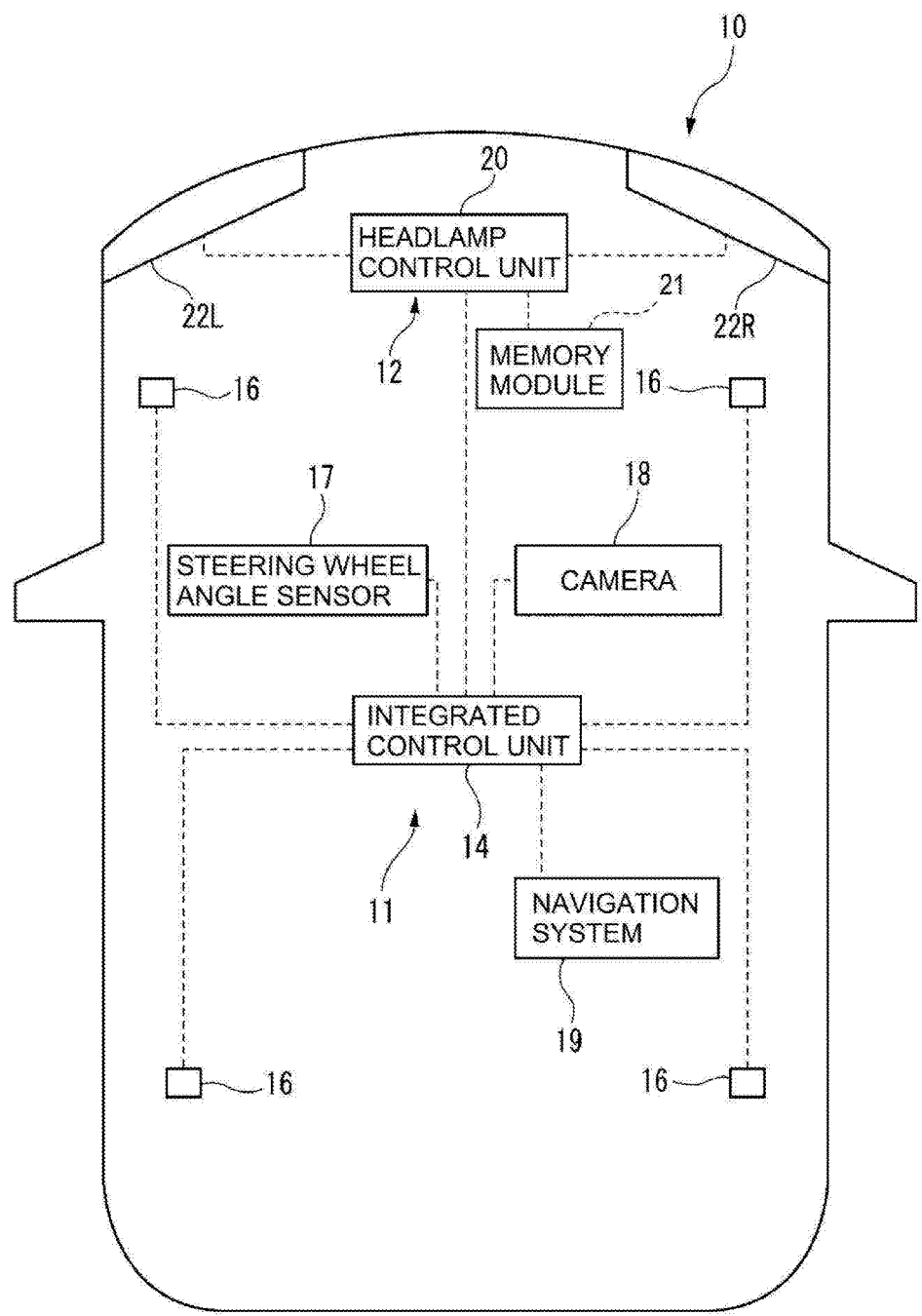
FIG. 1 is a schematic diagram showing schematically an overall configuration of a vehicle that installs a vehicle lamp control system according to an embodiment of the present invention.

The present invention will be described in detail by reference to the accompanying drawings. In the drawings for use in the following description, scales are changed as required so that constituent members are shown in such dimensions that make them recognizable.

FIG. 1 shows schematically an overall configuration of a vehicle 10 that installs a vehicle lamp control system 11 according to an embodiment of the present invention. The vehicle lamp control system 11 includes a headlamp system 12, an integrated control unit 14, wheel speed sensors 16, a steering wheel sensor 17, a camera 18 and a navigation system 19.

The integrated control unit 14 includes a CPU that executes various arithmetic operations, a ROM that stores various control programs and a RAM that is made use of as a working area for storing data and executing the programs and executes various controls in the vehicle 10.

The wheel speed sensors 16 are provided so as to correspond individually to four left and right front and rear wheels that are mounted on the vehicle 10. The wheel speed sensors 16 are connected to the integrated control unit 14 so as to communicate therewith and output signals signaling rotation speeds of the wheels to the integrated control unit 14. The integrated control unit 14 calculates a speed of the vehicle 10 by making use of the signals inputted thereinto from the wheel speed sensors 16.

The steering wheel angle sensor 17 is provided on a steering wheel and is connected to the integrated control unit 14 so as to communicate therewith. The steering wheel angle sensor 17 outputs a steering wheel angle pulse corresponding to a rotation angle of the steering wheel that is turned by the driver to the integrated control unit 14. The integrated control unit 14 calculates a traveling direction of the vehicle 10 by making use of the signal inputted thereinto from the steering wheel angle sensor 17.

The camera 18 includes an imaging device such as a CCD (Charged Coupled Device) sensor or a CMOS (Complementary Metal Oxide Semiconductor) sensor and captures an image ahead of the vehicle to generate image data. The camera 18 is connected to the integrated control unit 14 so as to communicate therewith, so that the image data generated thereby is outputted to the integrated control unit 14.

The navigation system 19 is connected to the integrated control unit 14 so as to communicate therewith and outputs information on a place where the vehicle 10 is traveling to the integrated control unit 14.

The headlamp system 12 includes a headlamp control unit 20, a right headlamp unit 22R and a left headlamp unit 22L. Hereinafter, the right headlamp unit 22R and the left headlamp unit 22L will generally be referred to as a headlamp unit 22 as required. The headlamp control unit 20 includes a CPU that executes various arithmetic operations and a RAM that is used as a working area for storing data and executing programs. In addition, the headlamp control unit 20 also has a memory module 21 (an example of an electric current setting unit) made up of a ROM that stores various control programs and controlling information. The headlamp control unit 20 controls the illumination of light by the headlamp unit 22 based on a control signal transmitted from the integrated control unit 14 and the various information stored in the memory module 21. The headlamp control unit 20 functions as a control unit of the present invention. The memory module 21 stores information on a first electric current distribution and a second electric current distribution which are set in advance. The information on the first electric current distribution and the second electric current distribution stored in the memory module 21 is derived by the headlamp control unit 20.

Figure 2:
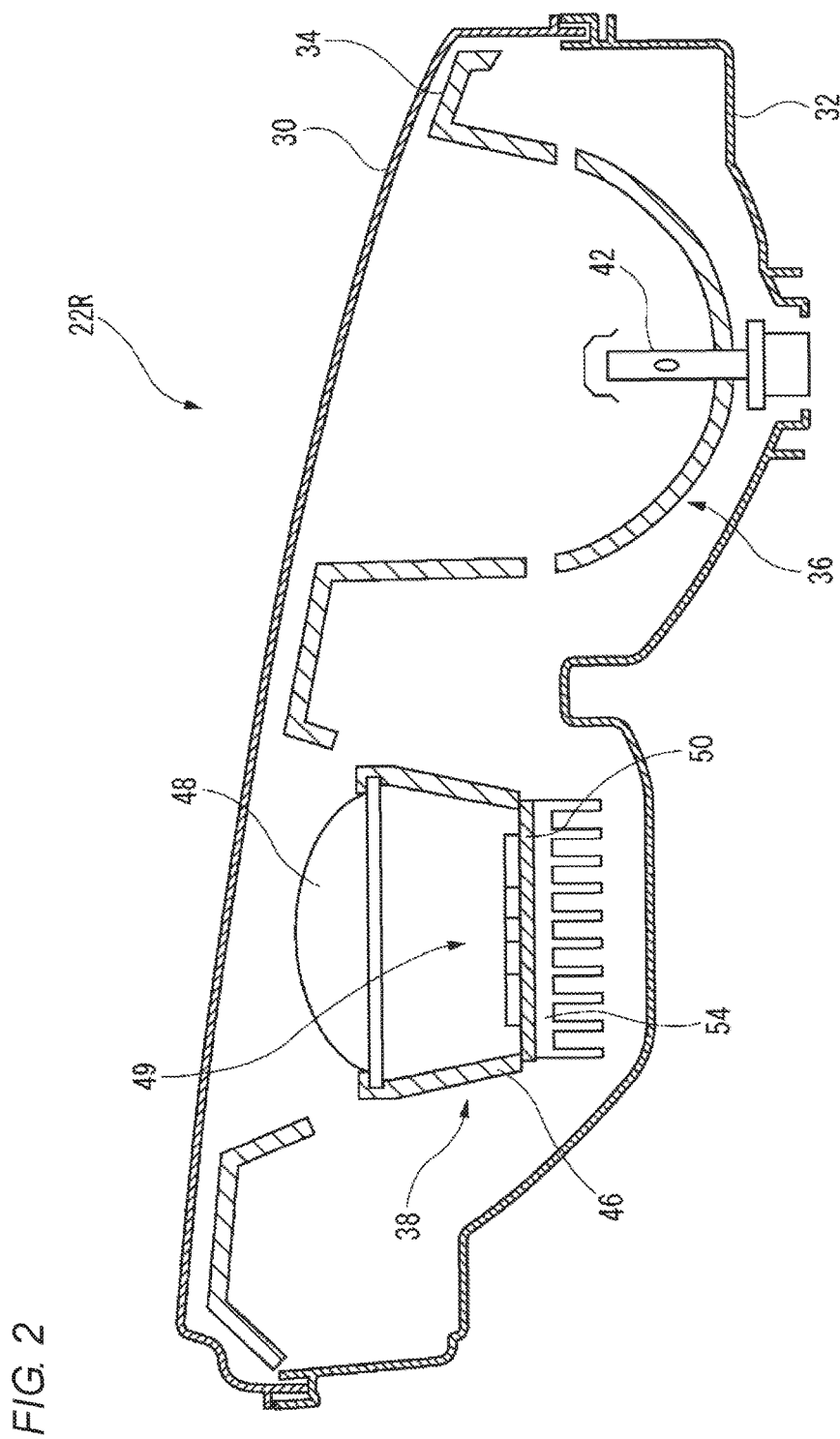
FIG. 2 is a horizontal sectional view showing the configuration of a right headlamp unit in FIG. 1.

FIG. 2 shows a horizontal sectional view of the right headlamp unit 22R as viewed from above. The right headlamp unit 22R includes a transparent cover 30, a lamp body 32, an extension 34, a first lamp unit 36, and a second lamp unit (an example of a light source unit) 38.

The transparent cover 30 is formed of a transparent resin material. The transparent cover 30 is mounted on the lamp body 32 to thereby define and form a lamp compartment. The first lamp unit 36 and the second lamp unit 38 are disposed in the lamp compartment.

The extension 34 has opening portions that transmit light emitted from the first lamp unit 36 and the second lamp unit 38. The extension 34 is fixed to the lamp body 32. The first lamp unit 36 is disposed further outboard than the second lamp unit 38.

The first lamp unit 36 is a so-called parabolic lamp unit and forms a low beam light distribution pattern, which will be described later. The first lamp unit 36 employs an incandescent lamp having a filament such as a halogen lamp or an HID (High Intensity Discharge) lamp such as a metal halide lamp. Since the configuration of the first lamp unit 36 is known, a detailed description thereof will be omitted here.

The second lamp unit 38 includes a holder 46, a projection lens 48, a light emitting unit 49, a circuit board 50 and a heat sink 54.

The projection lens 48 is mounted in one of opening portions of the holder 46 having a cylindrical shape. The projection lens 48 is a planoconvex aspheric lens for which a front surface is convex and a rear surface is plane and projects a light source image formed on a rear focal plane as a reverted image on to an imaginary vertical screen ahead of the headlamp unit.

The light emitting element unit 49 is provided on a front surface of the circuit board 50, and the heat sink 54 is provided on a rear surface of the circuit board 50. The heat sink 54 is formed of metal such as aluminum and is formed into a configuration having a number of heat dissipating fins.

Figure 3:
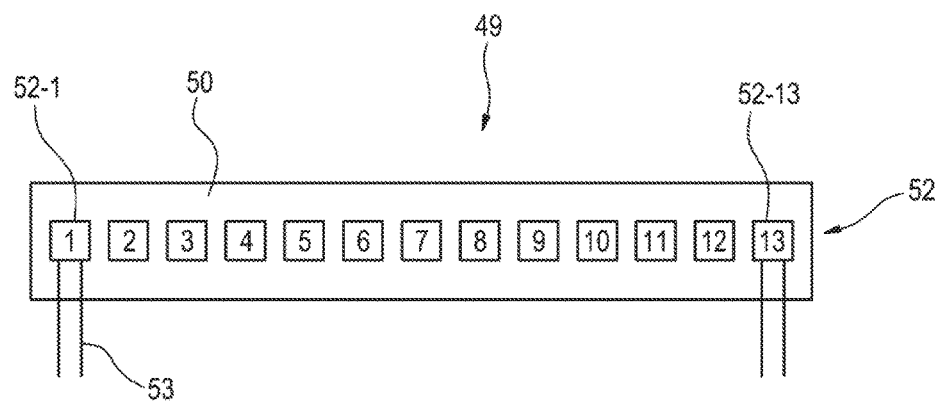
FIG. 3 is a schematic diagram showing schematically the configuration of a light emitting element unit in FIG. 2.

FIG. 3 shows a configuration of the light emitting element unit 49 as seen from the front of the vehicle. The light emitting element unit 49 includes a light emitting element array 52 that is mounted on the circuit board 50. The light emitting element array 52 includes a first semiconductor light emitting element 52-1 to a thirteenth semiconductor light emitting element 52-13.

The semiconductor light emitting elements 52-1 to 52-13 each have a rectangular parallelepiped shape of the same height and the same width. Although illustration is omitted, the semiconductor light emitting elements 52-1 to 52-13 each have a light source and a film. A light source is a white LED (Light Emitting Diode) having a light emitting surface measuring on the order of 1 mm square. The film is provided so as to cover this light emitting surface.

In FIG. 3, figures are given to the semiconductor light emitting elements 52-1 to 52-13, and reference numerals are omitted for a second semiconductor light emitting element 52-2 to a twelfth semiconductor light emitting element 52-12 other than the first semiconductor light emitting element 52-1 and the thirteenth semiconductor light emitting element 52-13. For example, the semiconductor light emitting element to which the FIG. 7 is given means a seventh semiconductor light emitting element 52-7.

The semiconductor light emitting elements 52-1 to 52-13 form current circuitries with the headlamp control unit 20 via control lines 53. In FIG. 3, control lines 53 for the second semiconductor light emitting element 52-2 to the twelfth semiconductor light emitting element 52-12 other than the first semiconductor light emitting element 52-1 and the thirteenth semiconductor light emitting element 52-13 are omitted from the illustration. The headlamp control unit 20 can control the turning on and off of the semiconductor light emitting elements 52-1 to 52-13, as well as luminous intensities thereof when the semiconductor light emitting elements are turned on by controlling electric current values that are supplied through the control lines 53.

As shown in FIG. 2, the light emitting element unit 49 is disposed in an interior of the holder 46 as a result of the circuit board 50 being mounted on the other opening portion of the holder 46. Images formed by the plurality of semiconductor light emitting elements 52-1 to 52-13 that the light emitting element unit 49 includes are projected on to the imaginary vertical screen ahead of the headlamp unit as a result of the semiconductor light emitting elements being illuminated. The plurality of semiconductor light emitting elements 52-1 to 52-13 function as a plurality of light sources.

The left headlamp unit 22L is symmetrical laterally with the right headlamp unit 22R with respect to an axis of the vehicle, hence a detailed description thereof will be omitted here. In the left headlamp unit 22L, too, a first semiconductor light emitting element 52-1 to a thirteenth semiconductor light emitting element 52-13 are arranged from the right- to left-hand sides of the vehicle. Namely, the left headlamp unit 22L and the right headlamp unit 22R are not symmetrical laterally in relation to the internal configuration of the second lamp unit 38.

Figure 4:
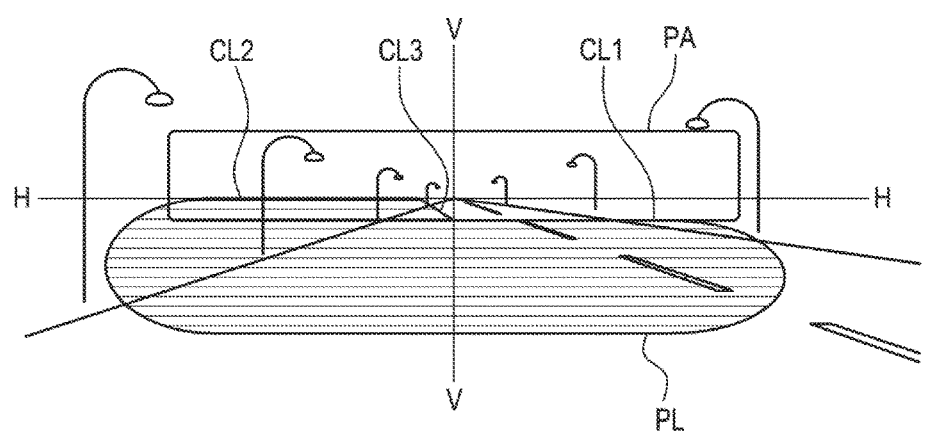
FIG. 4 is a schematic diagram showing schematically light distribution patterns formed by light from a headlamp system in FIG. 1.

FIG. 4 shows light distribution patterns that are formed on an imaginary vertical screen disposed, for example, in a position 25 meters ahead of the vehicle by light emitted to the front from the right headlamp unit 22R and the left headlamp unit 22L.

A low beam light distribution pattern PL is formed by a combination of light emitted from the first lamp units 36 of the right headlamp unit 22R and the left headlamp unit 22L. The low beam light distribution pattern PL is a low beam light distribution pattern for a left-hand traffic, having a first cut-off line CL1 to a third cut-off line CL3 along an upper edge thereof. The first cut-off line CL1 to the third cut-off line CL3 extend in a horizontal direction while partially dipping across a V-V line which is a vertical line passing through a vanishing point ahead of the lamp units as a boundary.

The first cut-off line CL1 is made use of as a cut-off line for an oncoming vehicle's lane. The third cut-off line CL3 extends upwards obliquely to the left from a left end portion of the first cut-off line CL1. The second cut-off line CL2 extends on an H-H line on a left-hand side of a point of intersection between the third cut-off line CL3 and the H-H line. Namely, the second cut-off line CL2 is made use of as a cut-off line for a subject vehicle's lane.

An additional light distribution pattern PA corresponds to an illuminating range of the present invention and is defined as a light distribution pattern that is formed by light emitted from all the semiconductor light emitting elements 52-1 to 52-13 of the second lamp units 38 of the right headlamp unit 22R and the left headlamp unit 22L.

The additional light distribution pattern PA includes the horizontal line (H-H line) and is formed into a belt-like shape that extends in the horizontal direction so that a lower edge is positioned on the first cut-off line CL1. This additional light distribution pattern forms a high beam together with the low beam light distribution pattern PL. Namely, the second lamp units 38 function as light sources for the high beam, hence the additional light distribution pattern PA formed by the second lamp units 38 is a high beam light distribution pattern.

Next, the control of the second lamp units 38 by the headlamp control unit 20 will be described.

Figure 5A:
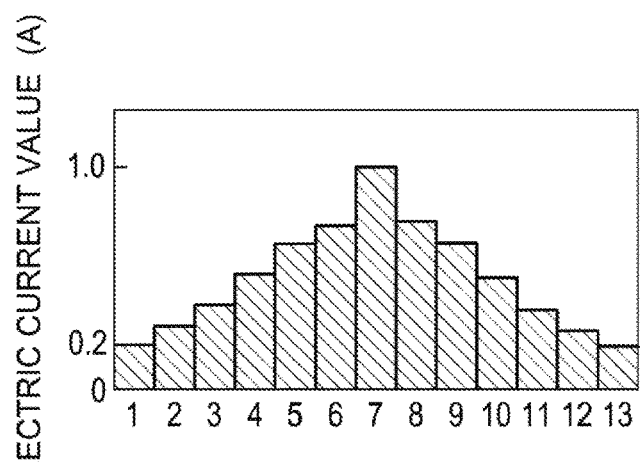
Figure 5B:
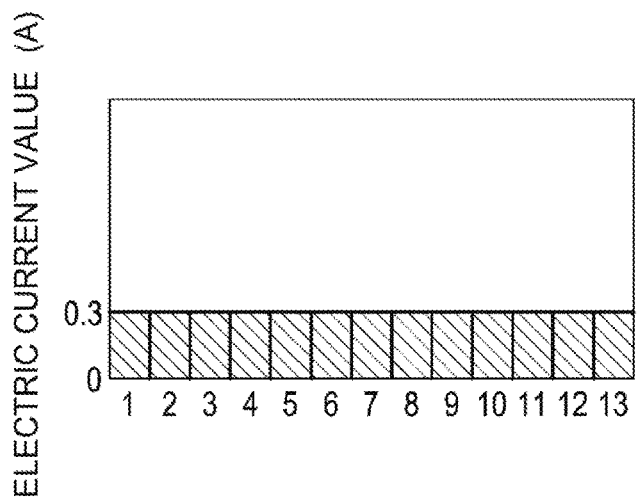
Figure 5C:
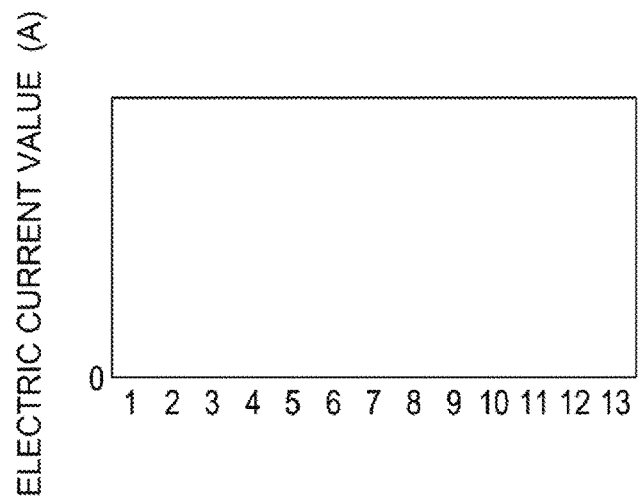

FIGS. 5A to 5C are graphs showing electric current distributions that are supplied to the second lamp units. FIG. 5A is a graph showing a first electric current distribution, FIG. 5B is a graph showing a second electric current distribution, and FIG. 5C is a graph showing an electric current distribution when the second lamp units are turned off. In FIGS. 5A to 5C, the figures are given to the semiconductor light emitting elements 52-1 to 52-13, and the reference numerals are omitted from the illustration. For example, the semiconductor light emitting element that is given the FIG. 7 means the seventh semiconductor light emitting element 52-7.

In the event that the high beam is used for illumination, the headlamp control unit 20 turns on the first lamp units 36 and the second lamp unit 38. Then, the additional light distribution pattern PA (refer to FIG. 4) is formed together with the low beam light distribution pattern PL by the first lamp units 36 ahead of the vehicle 10, whereby the high beam is emitted to illuminate ahead of the vehicle 10.

As this occurs, the headlamp control unit 20 deprives the information on the first electric current distribution from the memory module 21. The first electric current distribution is a distribution of electric current values for the plurality of semiconductor light emitting elements 52-1 to 52-13 when the predetermined additional light distribution pattern PA is formed ahead of the headlamp units by the semiconductor light emitting elements 52-1 to 52-13. As shown in FIG. 5A, in the first electric current distribution, the seventh semiconductor light emitting element 52-7 that is disposed at the center of the array of semiconductor light emitting elements is set at a highest electric current value, while the first semiconductor light emitting element 52-1 and the thirteenth semiconductor light emitting elements 52-13 that are disposed at ends of the array of the semiconductor light emitting elements are set at a lowest electric current value, resulting in the electric current distribution in which the electric current value gradually decreases from the seventh semiconductor light emitting element 52-7 at the center to the first semiconductor light emitting element 52-1 and the thirteenth semiconductor light emitting element 52-13 at the ends. In the first electric current distribution, for example, the highest electric current value is set at 1.0 (A), and the lowest electric current value is set at 0.2 (A).

Then, the headlamp control unit 20 supplies electric current to the semiconductor light emitting elements 52-1 to 52-13 of each of the second lamp units 38 based on the first electric current distribution that the headlamp control unit 20 deprives from the memory module 21 to turn on the second lamp units 38. This forms the additional light distribution pattern PA in which a central portion is bright and the luminous intensity is gradually lowered towards ends thereof ahead of the vehicle 10. By forming the additional light distribution pattern PA like this, the center of a foreground ahead of the vehicle 10 to which the driver particularly pays his or her attention is illuminated brightly, and the luminous intensity is lowered gradually towards ends of the foreground, thereby making it possible to suppress the load of the driver in watching carefully the foreground.

In turning off the second lamp units 38 from this state, the headlamp control unit 20 deprives information on the second electric current distribution from the memory module 21. As shown in FIG. 5A, the second electric current distribution is an electric current distribution in which almost the same electric current values are set for the semiconductor light emitting elements 52-1 to 52-13, and a mean electric current value of the second electric current distribution is smaller than that of the first electric current distribution. In the second electric current distribution, the electric current values set for the semiconductor light emitting elements 52-1 to 52-13 are set at 0.3 (A).

Then, the headlamp control unit 20 reduces the electric current that is supplied to the semiconductor light emitting elements 52-1 to 52-13 of each of the second lamp units 38 at the same reduction rate and turns on the semiconductor light emitting elements 52-1 to 52-13 based on the second electric current distribution deprived from the memory module 21.

Thereafter, the headlamp control unit 20 turns off the second lamp units 38 based on the turning off electric current distribution. As shown in FIG. 5C, this turning off electric current distribution is an electric current distribution in which the electric current values that are supplied to the semiconductor light emitting elements 52-1 to 52-13 are set at zero. This allows the electric current values that are supplied to the semiconductor light emitting elements 52-1 to 52-13 to be reduced at the same reduction rate to zero without any variation, and all the semiconductor electric light emitting elements 52-1 to 52-13 of the second lamp units 38 are turned off.

Here, reference examples of controlling the second lamp units 38 by the headlamp control unit 20 will be described.
(First Reference Example)

Figure 6A:
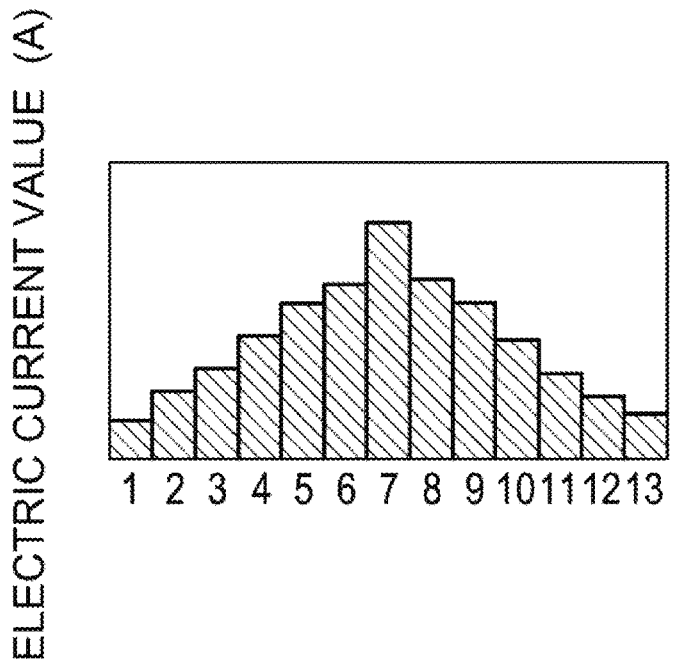
Figure 6B:
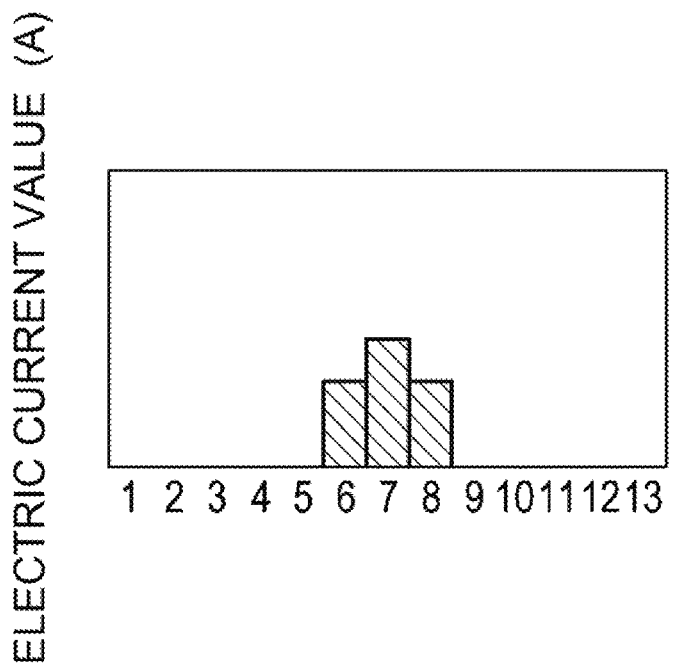

FIGS. 6A and 6B are graphs showing electric current distributions that are supplied to the second lamp units under a control according to a first reference example, of which FIG. 6A is a graph showing an electric current distribution used to turn on the second lamp units 38 and FIG. 6B is a graph showing an electric current distribution used to turn off the second lamp units 38. In FIGS. 6A and 6B, the figures are given to the semiconductor light emitting elements 52-1 to 52-13, while the reference numerals are omitted. For example, the semiconductor light emitting element that is given the FIG. 7 denotes the seventh semiconductor light emitting element 52-7.

In the first reference example, as shown in FIG. 6A, the second lamp units 38 are turned on based on an electric current distribution in which electric current values decrease from the semiconductor light emitting element at the center whose electric current value is set at the highest current value to the semiconductor light emitting elements at the ends whose electric current values are set at the lowest electric current value. In turning off the second lamp units 38 from this state, the headlamp control unit 20 reduces the electric current at the same reduction rate to zero based on the electric current distribution in which the electric current values that are supplied to the semiconductor light emitting elements 52-1 to 52-13 are set at zero to turn off the semiconductor light emitting elements 52-1 to 52-13.

According to this control, the semiconductor light emitting elements 52-1 to 52-13 are turned off in sequence from those at the ends whose electric current values are small. Consequently, in the turning off control according to the first reference example, as shown in FIG. 6B, even at the point in time when the semiconductor light emitting elements at the ends are turned off, the electric current values for the semiconductor light emitting elements at a central portion are not completely zero, hence these central semiconductor light emitting elements remain slightly on directly before the second lamp units 38 are turned off, this causing the driver to feel a sensation of physical disorder.
(Second Reference Example)

Figure 7A:
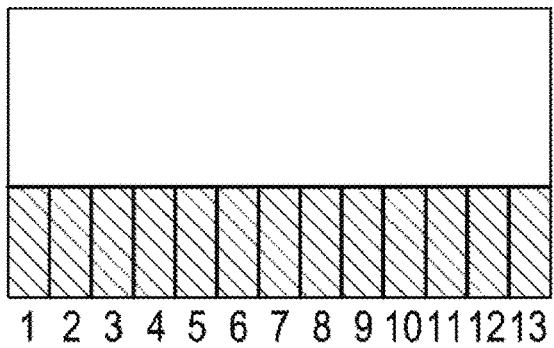
Figure 7B:
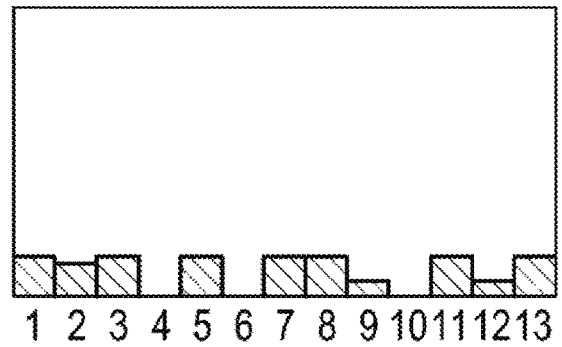

FIGS. 7A and 7B are graphs showing electric current distributions that are supplied to the second lamp units under a control according to a second reference example, of which FIG. 7A is a graph showing an electric current distribution used to turn on the second lamp units 38 and FIG. 7B is a graph showing an electric current distribution used to turn off the second lamp units 38. In FIGS. 7A and 7B, the figures are given to the semiconductor light emitting elements 52-1 to 52-13, while the reference numerals are omitted. For example, the semiconductor light emitting element that is given the FIG. 7 denotes the seventh semiconductor light emitting element 52-7.

In the second reference example, as shown in FIG. 7A, the second lamp units 38 are turned on based on an electric current distribution in which electric current values are set at uniform levels. In turning off the second lamp units 38 from this state, the headlamp control unit 20 reduces the electric current at the same reduction rate to zero based on the electric current distribution in which the electric current values that are supplied to the semiconductor light emitting elements 52-1 to 52-13 are set at zero to turn off the semiconductor light emitting elements 52-1 to 52-13.

In this control, although the configuration cannot be adopted in which the center of the foreground ahead of the vehicle 10 to which the driver particularly pays his or her attention is illuminated brightly, and the luminous intensity is lowered gradually towards the ends of the foreground, thereby making it possible to suppress the load of the driver in watching carefully the foreground, since the semiconductor light emitting elements 52-1 to 52-13 are turned off at the same time, the driver can be restrained from being caused to feel a sensation of physical disorder.

In this control, too, however, even though the semiconductor light emitting elements 52-1 to 52-13 are turned off altogether from the state in which the semiconductor light emitting elements 52-1 to 52-13 remain on at the high electric current values, as shown in FIG. 7B, there may be such a situation that the electric current values of the semiconductor light emitting elements 52-1 to 52-13 vary due to an error in controlling the electric current directly before the semiconductor light emitting elements 52-1 to 52-13 are turned off. Owing to this, there may be such a situation that the foreground ahead of the vehicle 10 is illuminated with an uncontrolled pattern of light, deteriorating the appearance of the headlamp units directly before the second lamp units 38 are turned off.

Thus, as has been described heretofore, according to the vehicle lamp control system of the embodiment, when the second lamp units 38 are turned off from the state in which the additional light distribution pattern PA using the first electric current distribution is formed, all the semiconductor light emitting elements 52-1 to 52-13 are turned off after the plurality of semiconductor light emitting elements 52-1 to 52-13 are turned on based on the second electric current distribution in which the electric current values supplied to the plurality of semiconductor light emitting elements 52-1 to 52-13 are almost the same and whose mean electric current value is smaller than that of the first electric current distribution. Consequently, the driver can be restrained from being caused to feel a sensation of physical disorder that the driver would otherwise have to feel as a result of part of the semiconductor light emitting elements 52-1 to 52-13 remaining on or the semiconductor light emitting elements 52-1 to 52-13 being turned off in an uncontrolled fashion, and the appearance of the headlamp units can be enhanced.

In addition, as in this embodiment, in the event that the additional light distribution pattern PA that is formed by the second lamp units 38 is the high beam pattern, the driver can be restrained from being caused to feel a sensation of physical disorder and the appearance of the headlamp units can be enhanced when the high beam is turned off.

(First Modified Example)

Hereinafter, a first modified example will be described by reference to FIG. 8.

In the embodiment described above, all the semiconductor light emitting elements 52-1 to 52-13 are turned off after the plurality of semiconductor light emitting elements 52-1 to 52-13 are turned on based on the second electric current distribution from the state in which the additional light distribution pattern PA using the first electric current distribution is formed. However, all the semiconductor light emitting elements 52-1 to 52-13 may be turned off after the plurality of semiconductor light emitting elements 52-1 to 52-13 are turned on based on the second electric current distribution and further, the plurality of semiconductor light emitting elements 52-1 to 52-13 are turned on based on a third electric current distribution whose mean current value is smaller than that of the second electric current distribution.

Figure 8A:
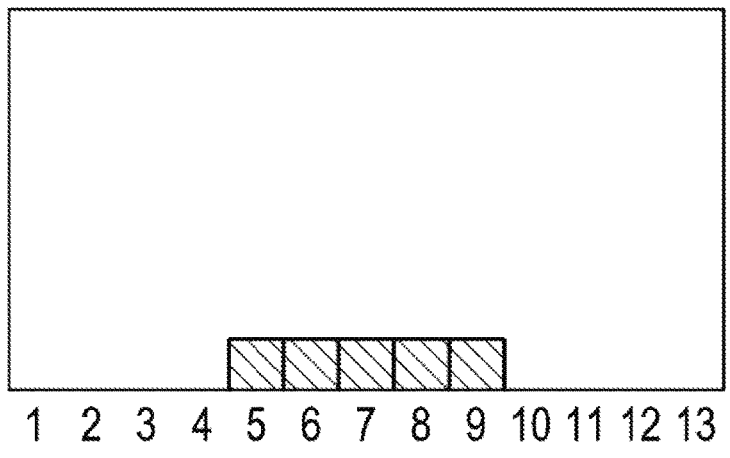
FIGS. 8A and 8B are graphs explaining a first modified example 1, both graphs showing a third electric current distribution supplied when a second lamp unit is turned off.
Figure 8B:
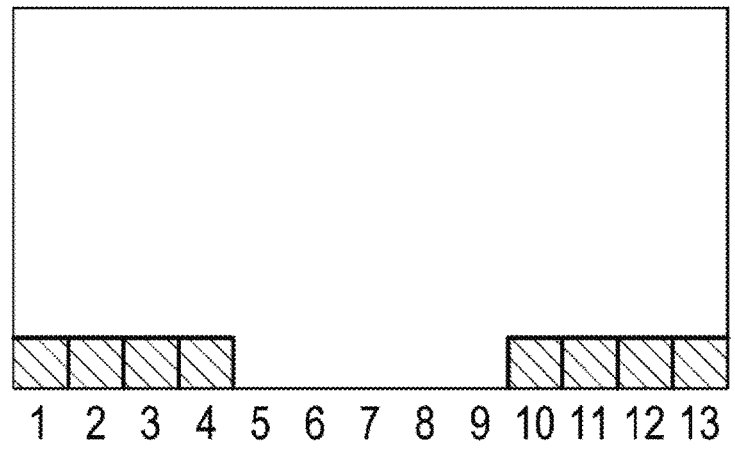

As the third electric current distribution, an electric current distribution as shown in FIG. 8A should be adopted in which electric current values of several of the semiconductor light emitting elements 52-1 to 52-13 which lie near the center of the array of semiconductor light emitting elements 52-1 to 52-13 are set at uniform and low electric values. Alternatively, an electric current distribution as shown in FIG. 8B should be adopted in which electric current values of several of the semiconductor light emitting elements 52-1 to 52-13 which lie near ends of the array of semiconductor light emitting elements 52-1 to 52-13 are set at uniform and low electric values. Information on the third electric current distribution is stored in the memory module 21 as with the first electric distribution and the second electric distribution and is deprived from the memory module 21 by the headlamp control unit 20 when the second lamp units 38 are turned off. In FIGS. 8A and 8B, the figures are given to the semiconductor light emitting elements 52-1 to 52-13, while the reference numerals are omitted from the illustration. For example, the semiconductor light emitting element that is given the FIG. 7 denotes the seventh semiconductor light emitting element 52-7.

In this way, all the semiconductor light emitting elements 52-1 to 52-13 are turned off after the semiconductor light emitting elements 52-1 to 52-13 are turned on based on the second electric current distribution and further, the plurality of semiconductor light emitting elements 52-1 to 52-13 are turned on based on the third electric current distribution whose mean current value is smaller than that of the second electric current distribution, whereby the driver can be restrained from being caused to feel a sensation of physical disorder and the appearance of the headlamp units can be enhanced when the second lamp units 38 are turned off. In particular, in case the third electric current distribution (refer to FIG. 8B) is used in which the electric current values of several of the semiconductor light emitting elements 52-1 to 52-13 which lie near the ends of the array of semiconductor light emitting elements 52-1 to 52-13 are set at the uniform and low electric values, the illumination light whose luminous intensity tends to be increased higher near the center by the projection lens 48 can be turned off in a uniformed state, whereby the appearance of the headlamp units can be enhanced more when they are turned off.

(Second Modified Example)

Figure 9A:
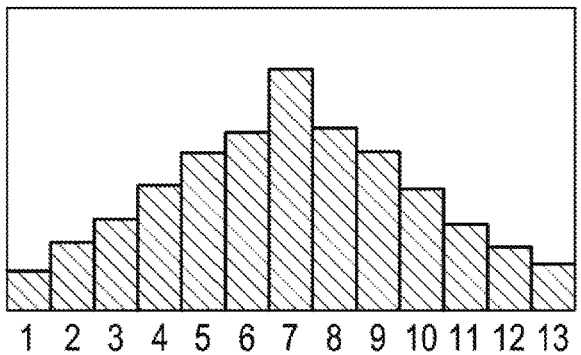
FIGS. 9A to 9C are graphs explaining a second modified example.
Figure 9B:
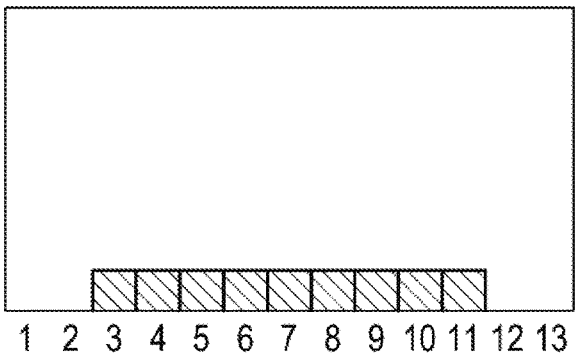

Hereinafter, a second modified example will be described by reference to FIGS. 9A and 9B.

Figure 9C:
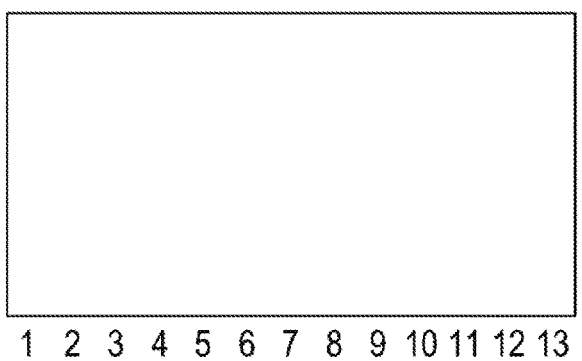

In the second electric current distribution that is described by reference to FIG. 5B, almost the same electric current values are set individually for the semiconductor light emitting elements 52-1 to 52-13. However, the present invention is not limited thereto. For example, as shown in FIG. 9B, the second electric distribution may adopt an electric current distribution in which almost the same electric current values are set for the semiconductor light emitting elements 52-3 to 52-11, that is, some semiconductor light emitting elements of the plurality of semiconductor light emitting elements. As this occurs, when the second lamp units 38 are turned off from a state in which an additional light distribution pattern PA using a first electric current distribution shown in FIG. 9A is formed, after a state is attained in which the plurality of semiconductor light emitting elements 52-3 to 52-11 are turned on based on the second electric current distribution in which almost the same electric current values are set for the semiconductor light emitting elements 52-3 to 52-11 of the plurality of semiconductor light emitting elements 52-1 to 52-13 and whose mean electric current value is smaller than that of the second electric current distribution and the semiconductor light emitting elements 52-1, 52-2, 52-12, 52-13 are turned off (refer to FIG. 9B), the semiconductor light emitting elements 52-3 to 52-11 which remain on are turned off almost altogether (refer to FIG. 9C). With this configuration, too, the driver can be restrained from being caused to feel a sensation of physical disorder that the driver would otherwise have to feel due to part of the semiconductor light emitting elements 52-1 to 52-13 remaining on directly before the second lamp units 38 are turned off or the semiconductor light emitting elements 52-1 to 52-13 being turned off in an irregular fashion, and the appearance of the headlamp units can be enhanced.

(Third Modified Example)

Figure 10:
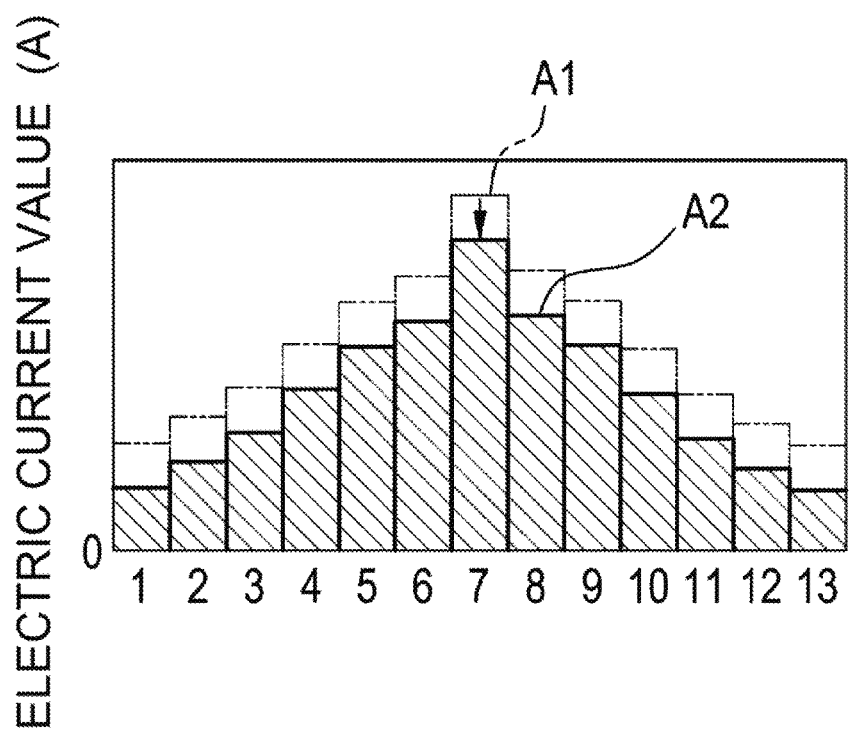
FIG. 10 is a graph explaining a third modified example.

Hereinafter, a third modified example will be described by reference to FIG. 10.

In the embodiment and the first to second modified examples, the second lamp units 38 are described as being turned off while the semiconductor light emitting elements are being illuminated based on the first electric current distribution that is stored in the memory module 21, however the present invention is not limited thereto. For example, there may be a situation in which the headlamp control unit 20 shifts gradually an electric current distribution A1 that is used to illuminate the semiconductor light emitting elements to an electric current distribution A2 in which electric current values are set lower than those of the electric current distribution A2 when an ambient environment of the vehicle 10 is detected to be bright by a luminous intensity sensor mounted on the vehicle 10. The present invention can also be applied to a case where the turning off operation is started in the midst of the electric current distribution used to illuminate the semiconductor light emitting elements being shifted from the electric current distribution A1 to the electric current distribution A2. As this occurs, the electric current distribution taking place at the point of time when a signal is inputted that signals the turning off of the semiconductor light emitting elements should be the first electric current distribution of the present invention.

The electric current distribution taking place in the midst of the transition from the electric current distribution A1 to the electric current distribution A2 may be obtained through an arithmetic operation executed by an operating unit (an example of the electric current setting unit) such as the headlamp control unit 20. An operation to be performed after the issuance of a command to turn off the semiconductor light emitting elements may be similar to the operation described in the example above. Even in the event that the electric current distribution being used when the headlamp system 12 is detected to have reached high temperatures is shifted to an electric current distribution in which electric current values are lower or in the event that the electric current distribution being used when the vehicle 10 is detected to stay stationary is shifted to an electric current distribution in which electric current values are lower, similar to the example described above, the electric current distribution taking place when the signal is inputted that signals a command to turn off the semiconductor light emitting elements can be the first electric current distribution of the present invention.

(Fourth Modified Example)

Hereinafter, a fourth modified example will be described by reference to FIG. 11.

Figure 11A:
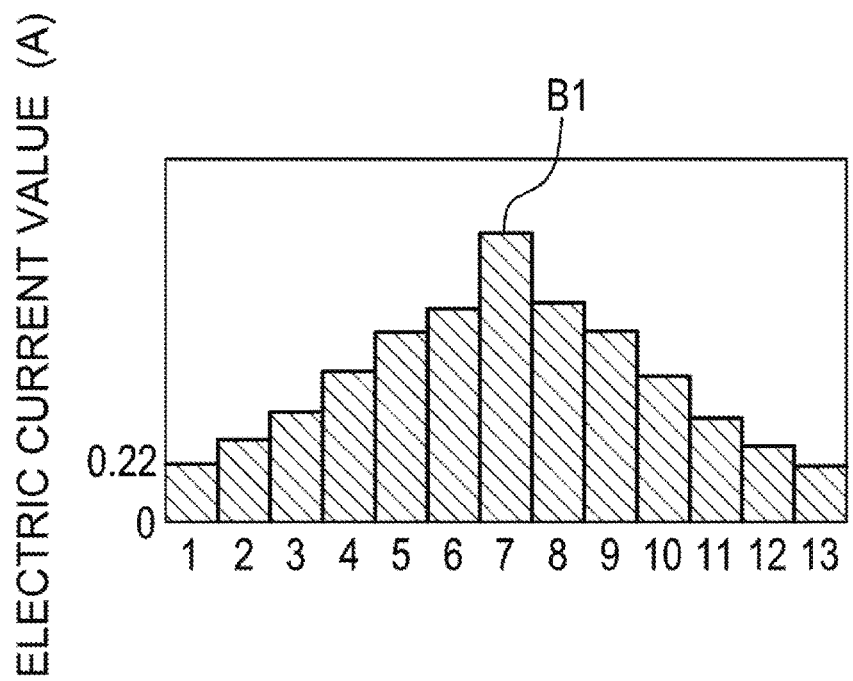
FIGS. 11A and 11B are graphs explaining a fourth modified example.
Figure 11B:
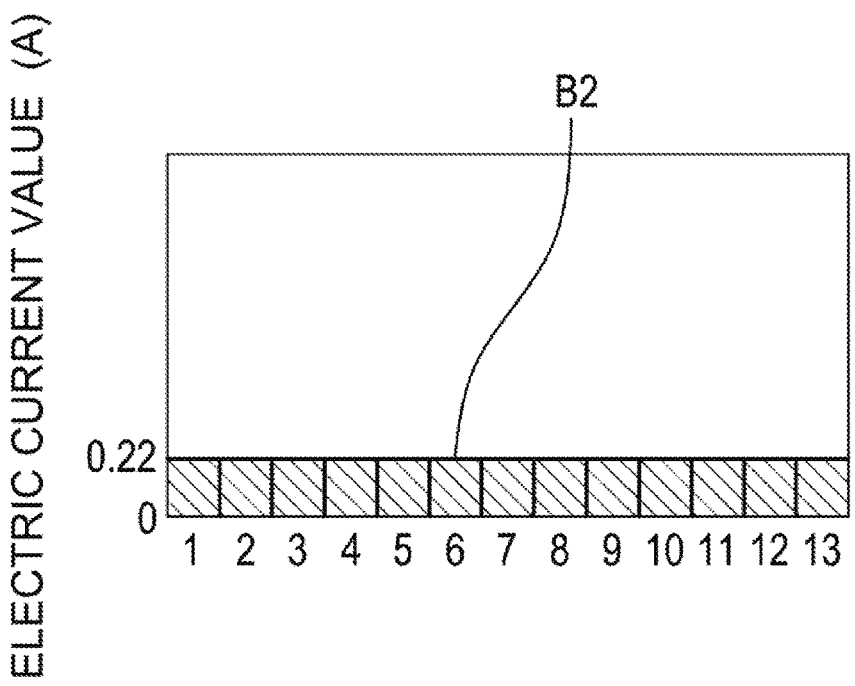

In the embodiment and the first to second modified examples, the second electric current distribution set in advance is described as being stored in the memory module 21, however the present invention is not limited thereto. The second electric current distribution may be obtained through an arithmetic operation executed by an operating unit (an example of the electric current setting unit) such as the headlamp control unit 20. For example, there may be a situation in which the semiconductor light emitting elements are illuminated by the use of a first electric current distribution B1 as shown in FIG. 11A in which a lowest electric current value is set at 0.22 (A). As this occurs, when a signal is inputted which signals a command to turn off the semiconductor light emitting elements, the arithmetic operating unit such as the headlamp control unit 20 may extract the lowest value in the first electric current distribution B1 to obtain a second electric current distribution B2 shown in FIG. 11B by the use of the lowest value so extracted. As shown in FIG. 11B, the second electric current distribution B2 is an electric current distribution in which almost the same electric values are set individually for the semiconductor light emitting elements, and in the second electric current distribution, the electric current values for the semiconductor light emitting elements are set at 0.22 (A) that is the lowest value of the first electric current distribution B1. An operation to be performed after the command to turn off the semiconductor light emitting elements is issued and the second electric current distribution is calculated may be similar to the operation described in the example above. In addition, the third electric current distribution that is described in the first modified example may be calculated through an arithmetic operation, as done in relation to the second electric current distribution, by using the lowest value of the electric current distribution taking place just before.

(Fifth Modified Example)

In the embodiment and the first to second modified examples, the first electric current distribution and the second electric current distribution that are set in advance are described as being stored in the memory module 21, however the present invention is not limited thereto. For example, a first electric current distribution and a second current electric distribution may be obtained through arithmetic operations executed by an arithmetic operating unit (an example of the electric current setting unit) such as the headlamp control unit 20 by combining the third and fourth modified examples. Namely, a second electric current distribution may be obtained through an arithmetic operation based on a lowest value of the first electric current distribution obtained through the arithmetic operation.

The present invention is not limited to the embodiment that has been described heretofore but can be modified or improved freely as required. In addition, the materials, shapes, dimensions, numerical values, forms, numbers and locations of the constituent elements described in the embodiment are not limited thereto but are arbitrary provided that the present invention can be achieved.

While the present invention has been described in detail and by reference to the specific embodiment, it is obvious to those skilled in the art that various alterations and modifications can be made thereto as required without departing from the spirit and scope of the present invention.

This patent application is based on Japanese Patent Application No. 2014-19689 filed on Feb. 4, 2014, the contents of which are incorporated herein by reference.

The invention claimed is:

1. A vehicle lamp control system comprising:
   a light source unit in which a plurality of semiconductor light emitting elements are arranged in a predetermined direction, the plurality of light emitting elements including a centermost light emitting element, respective outermost light emitting elements, and intermediate light emitting elements arranged between the centermost light emitting element and the respective outermost light emitting elements;
   an electric current setting unit that can set a first electric current distribution in which electric current values for the plurality of semiconductor light emitting elements to form a predetermined light distribution pattern ahead of a lamp are set individually for the plurality of semiconductor light emitting elements and a second electric current distribution in which electric current values are set individually for at least a portion of the plurality of semiconductor light emitting elements and whose mean electric current value is smaller than that of the first electric current distribution; and
   a control unit that controls individually the turning on and off of the plurality of semiconductor light emitting elements based on the electric current distributions set by the electric current setting unit, wherein
   when the light source unit is turned off from a state in which a light distribution pattern is formed by using the first electric current distribution, the control unit performs a control in which all of the plurality of semiconductor light emitting elements are turned off after the plurality of semiconductor light emitting elements are turned on based on the second electric current distribution, and
   in the first electric current distribution the electric current values for the plurality of semiconductor light emitting elements are set individually such that each respective electric current value of the intermediate light emitting elements gradually decreases from the centermost light emitting element, being set at a highest electric current value, to the respective outermost light emitting elements, being set at a lowest electric current value.

2. The vehicle lamp control system according to claim 1, wherein
   the electric current setting unit can set a third electric current distribution whose mean electric current value is smaller than that of the second electric current distribution, and wherein
   when the light source unit is turned off from a state in which a light distribution pattern is formed by using the first electric current distribution, the control unit performs a control in which all the plurality of semiconductor light emitting elements are turned off after the plurality of semiconductor light emitting elements are turned on based on the second electric current distribution and further, the plurality of semiconductor light emitting elements are turned on based on the third electric current distribution.

3. The vehicle lamp control system according to claim 2, wherein
   the predetermined light distribution pattern is a high beam light distribution pattern.

4. The vehicle lamp control system according to claim 1, wherein
   the predetermined light distribution pattern is a high beam light distribution pattern.

5. The vehicle lamp control system according to claim 1, wherein
   the electric current setting unit can set the first electric current distribution such that electric current values for the plurality of semiconductor light emitting elements are set individually and separately and can set the second electric current distribution such that electric current values for at least a portion of the plurality of semiconductor light emitting elements are set individually and separately.

6. A vehicle lamp control system comprising:
   a light source unit in which a plurality of semiconductor light emitting elements are arranged in a predetermined direction and are connected in parallel with each other, the plurality of light emitting elements including a centermost light emitting element, respective outermost light emitting elements, and intermediate light emitting elements arranged between the centermost light emitting element and the respective outermost light emitting elements;
   an electric current setting unit that can set electric current values for each of the plurality of semiconductor light emitting elements individually; and
   a control unit that controls individually the turning on and off of the plurality of semiconductor light emitting elements based on the electric current distributions set by the electric current setting unit,
   wherein the electric current setting unit can set a first electric current distribution in which electric current values for the plurality of semiconductor light emitting elements to form a predetermined light distribution pattern ahead of a lamp are set individually for the plurality of semiconductor light emitting elements and a second electric current distribution in which electric current values are set individually for at least a portion of the plurality of semiconductor light emitting elements and whose mean electric current value is smaller than that of the first electric current distribution,
   wherein when the light source unit is turned off from a state in which a light distribution pattern is formed by using the first electric current distribution, the control unit performs a control in which all of the plurality of semiconductor light emitting elements are turned off after the plurality of semiconductor light emitting elements are turned on based on the second electric current distribution, and
   in the first electric current distribution the electric current values for the plurality of semiconductor light emitting elements are set individually such that each respective electric current value of the intermediate light emitting elements gradually decreases from the centermost light emitting element, being set at a highest electric current value, to the respective outermost light emitting elements, being set at a lowest electric current value.

* * * * *